(12) United States Patent
Brookner

(10) Patent No.: US 7,559,466 B2
(45) Date of Patent: Jul. 14, 2009

(54) ITEM AUTHENTICATION

(75) Inventor: George M Brookner, Shelton, CT (US)

(73) Assignee: Neopost Technologies, Bagneux (FR)

( * ) Notice: Subject to any disclaimer, the term of this patent is extended or adjusted under 35 U.S.C. 154(b) by 140 days.

(21) Appl. No.: 10/953,499

(22) Filed: Sep. 30, 2004

(65) Prior Publication Data

US 2005/0133594 A1 Jun. 23, 2005

Related U.S. Application Data

(60) Provisional application No. 60/507,484, filed on Oct. 2, 2003.

(51) Int. Cl.
*G06K 5/00* (2006.01)
(52) U.S. Cl. .................. 235/382; 235/383; 235/462.01
(58) Field of Classification Search .................. 235/382, 235/383, 385, 462.1, 494, 462.09
See application file for complete search history.

(56) References Cited

U.S. PATENT DOCUMENTS

| | | | | |
|---|---|---|---|---|
| 3,890,599 | A * | 6/1975 | Simjian | 340/5.86 |
| 5,128,752 | A * | 7/1992 | Von Kohorn | 705/10 |
| 5,855,007 | A | 12/1998 | Jovicic et al. | |
| 5,974,150 | A * | 10/1999 | Kaish et al. | 713/179 |
| 6,030,001 | A | 2/2000 | Kruckemeyer | |
| 6,308,165 | B1 * | 10/2001 | Gilham | 705/62 |
| 6,427,139 | B1 * | 7/2002 | Pierce | 705/60 |
| 6,454,174 | B1 | 9/2002 | Sansone | |
| 6,505,179 | B1 | 1/2003 | Kara | |
| 6,701,304 | B2 * | 3/2004 | Leon | 705/401 |
| 2002/0010640 | A1 | 1/2002 | Dutta et al. | |
| 2002/0040346 | A1 | 4/2002 | Kwan | |
| 2002/0169623 | A1 | 11/2002 | Call et al. | |
| 2002/0179709 | A1 | 12/2002 | Mehler | |
| 2003/0024988 | A1 | 2/2003 | Stanard | |
| 2004/0030568 | A1 | 2/2004 | Kocznar et al. | |

FOREIGN PATENT DOCUMENTS

| | | |
|---|---|---|
| JP | 2005191893 A * | 7/2005 |
| WO | WO 9216913 A1 * | 10/1992 |
| WO | WO 97/40472 | 10/1997 |
| WO | WO 98/59311 | 12/1998 |
| WO | WO01/61652 | 8/2001 |
| WO | WO 01/61652 A2 | 8/2001 |
| WO | WO02/31711 | 4/2002 |
| WO | WO 02/31711 A1 | 4/2002 |
| WO | WO 02/39653 A2 | 5/2002 |

* cited by examiner

*Primary Examiner*—Seung H Lee
(74) *Attorney, Agent, or Firm*—Townsend & Townsend & Crew LLP

(57) ABSTRACT

A system for authenticating items includes: a processing unit for generating indicia for imprints to be applied to items and authenticating imprints applied to items, each indicium including a cryptographically encoded component; at least one item printing station for printing imprints on items as generated by the processing unit; and at least one item presentation station to which items are presented in authenticating the same. The item presentation station is configured to transmit data relating to the indicium on an item presented thereto to the processing unit, and to receive an authentication message in dependence upon whether the indicium is determined to be valid or invalid.

44 Claims, 3 Drawing Sheets

ITEM AUTHENTICATION

This application claims priority benefit under 35 USC 119(e) of provisional patent application 60/507,484, filed Oct. 2, 2003.

FIELD OF THE INVENTION

The present invention relates to a system for and a method of authenticating an item, in particular a document, and especially a document embodying monetary value.

BACKGROUND OF THE INVENTION

Historically, the authentication of items, typically documents, has required a physical means of proof, in particular by applying a signature, which can be attested, for example by notarization, or being under a seal. Thus, the original item is required for authentication.

In online transactions, such as over the internet, proof of authenticity is invariably required. Depending on the security of websites and the supporting servers, which may vary dramatically from one to another, information, typically personal and financial information, conveyed to or stored by websites is subject to misappropriation by computer hackers.

It is an aim of the present invention to provide a system for and a method of authenticating an item, in particular a document, and especially a document embodying monetary value, which utilizes a cryptographically-encoded indicium as the means of authentication.

SUMMARY OF THE INVENTION

The present invention, in its preferred embodiment, provides a system and method in which a customer is provided with credentials from a provider, which credentials, when digitally scanned by a merchant, confirm the authenticity of those credentials. This system and method in particular enables the realization of a proof of authenticity in an economic transaction. For example, the transaction may establish a communication between a customer and the server of a provider in conducting a transaction of economic value between the customer and the provider. The transaction may involve the delivery of financial value to a customer which the customer could convert into goods, services or currency.

In its preferred embodiment a printed representation of value includes a representative coding, preferably a two-dimensional barcode, which depicts a cryptographically secure and digitally signed content of the transmitted value.

Thus, in its preferred embodiment, the present invention provides a one-way transaction security system for effecting transactions, in the form of digital messages with associated certificates, between providers and selected customers, where digital certification represents public key cryptography technology ensuring that both a customer and a provider are uniquely identified to each other following private/public key cryptographic standards. The standards encompass, for example, DSA, RSA and ECDSA signing and validation, and DES and AES encryption.

In its preferred embodiment a barcode representation of a transaction is printed by the customer, which barcode, when scanned by the recipient merchant, together with a personal identification number (PIN) provided by the customer to the merchant, enables authentication of the transaction and allows the customer to receive the goods, services, or currency as allocated by the data conveyed in the barcode.

In authenticating the transaction as embodied in the barcode, the barcode as scanned by the merchant and the PIN as provided by the customer are transmitted to the provider, and the provider confirms the transaction and credits the account of the merchant in respect of the transaction. In its preferred embodiment the PIN as provided by the customer is compared to that embodied in the barcode, with public key encryption technology being utilized to validate the content of the barcode. In one embodiment a customer would be allowed a limited number of attempts to input the customer PIN.

In one example, the barcode could be a coupon for free merchandise, with the cost of the merchandise being paid for by the provider and not the customer. In another example, the transaction could be a financial transaction via an automated clearing house (ACH).

In one embodiment the validation process can also provide for the detection of a copied barcode, whereby scanned data from each barcode as transmitted to the provider is retained, and should there be another attempt to receive the value represented by a copied barcode and purloined PIN, the provider would identify the second transaction as attempted fraud, and consequently reject the second transaction.

The present invention, in its preferred embodiment, also encompasses a method of allocating public keys and associated certificates between customers and providers such that, for each transaction, a new key pair and associated certificate is created, based upon the preceding certificate.

Once a secured and trusted relationship is established, value-added barcodes may be printed by a customer and used directly to purchase entities, such as lottery tickets, from home, receive a money order from an institution, etc. These barcodes, when scanned by the appropriate end service supplier, allow the value embodied within the barcode to be transferred to the customer.

In its preferred embodiment the use of a public key digital certificate hierarchy (level of trust) assures non-repudiation, where the barcode on a customer document is scanned and validated as authentic by the provider, with the resultant transaction of value being accounted for between the customer who receives the value, the merchant who provides the value, and the provider who compensates the merchant for the value provided to the customer.

In one aspect the present invention provides an authentication system for authenticating items, comprising: a processing unit for generating indicia for imprints to be applied to items and authenticating imprints applied to items, each indicium including a cryptographically-encoded component; at least one item printing station for printing imprints on items as generated by the processing unit; and at least one item presentation station to which items are presented in authenticating the same, wherein the at least one item presentation station is configured to transmit data relating to the indicium on an item presented thereto to the processing unit, and receive an authentication message in dependence upon whether the indicium is determined to be valid or invalid.

Preferably, the indicium comprises a barcode.

In one embodiment the indicium comprises a two-dimensional barcode.

In one embodiment the cryptographically-encoded component is encoded by digital signature.

In another embodiment the cryptographically-encoded component is encoded by encryption.

In a further embodiment the cryptographically-encoded component is encoded by encryption and digital signature.

In one embodiment the at least one item printing station is operable by a user to print an imprint on an item.

In one embodiment the at least one item printing station is configured to provide for a user to request an indicium for an imprint from the processing unit, with the processing unit being configured to transmit the indicium for the imprint to the at least one item printing station.

In another embodiment the at least one item printing station is configured to receive an indicium for an imprint from the processing unit as requested by a third party on behalf of a user, with the processing unit being configured to transmit the indicium for the imprint to the at least one item printing station.

In another embodiment the at least one item printing station is operable by a third party to print an imprint on an item for use by a user.

Preferably, the indicium is assigned at least one security parameter which is not provided in human-readable form in the imprint and has to be satisfied in authenticating the indicium.

In one embodiment the security parameter includes an assigned personal security code, whereby the indicium is authenticated only when presented with the assigned security code.

In one embodiment the security parameter includes a time frame code, whereby the indicium is authenticated only when presented within a predefined time period.

In one embodiment the security parameter includes an assigned location code, whereby the indicium is authenticated only when presented at one or more predefined item presentation stations.

In one embodiment the security parameter includes an assigned merchant code, whereby the indicium is authenticated only when presented at one or more predefined merchants.

Preferably, the items comprise documents.

In one embodiment the documents embody monetary value.

In another embodiment the documents comprise evidentiary documents.

In another aspect the present invention provides a method of authenticating items, the method, for each item, comprising the steps of: generating a transaction data stream at a remote center for an indicium to be applied to an item as an imprint, the indicium including a cryptographically-encoded component; printing the imprint on an item; presenting the item including the indicium at an item presentation station; providing data relating to the indicium on the presented item to the remote center; authenticating the indicium; and providing an authentication message to the item presentation station in dependence upon whether the indicium is determined to be valid or invalid.

Preferably, the indicium comprises a barcode.

In one embodiment the indicium comprises a two-dimensional barcode.

In one embodiment the cryptographically-encoded component is encoded by digital signature.

In another embodiment the cryptographically-encoded component is encoded by encryption.

In a further embodiment the cryptographically-encoded component is encoded by encryption and digital signature.

In one embodiment the printing step is performed at the request of a user.

In one embodiment the transaction data generating step is performed at the request of the user.

In another embodiment the transaction data generating step is performed at the request of a third party on behalf of the user.

In another embodiment the printing step is performed at the request of a third party to print the imprint on an item for use by a user.

Preferably, the indicium is assigned at least one security parameter which is not provided in human-readable form in the imprint, and, in the authentication step, a check is performed to determine that the at least one assigned security parameter is satisfied.

In one embodiment the security parameter includes an assigned personal security code, whereby the indicium is authenticated only when presented with the assigned security code.

In one embodiment the security parameter includes a time frame code, whereby the indicium is authenticated only when presented within a predefined time period.

In one embodiment the security parameter includes an assigned location code, whereby the indicium is authenticated only when presented at one or more predefined item presentation stations.

In one embodiment the security parameter includes an assigned merchant code, whereby the indicium is authenticated only when presented at one or more predefined merchants.

Preferably, the items comprise documents.

In one embodiment the documents embody monetary value.

In another embodiment the documents comprise evidentiary documents.

In a further aspect the present invention provides an authentication system for authenticating items, comprising: a processing unit for authenticating imprints applied to items, each imprint comprising an indicium including a cryptographically-encoded component and having at least one security parameter assigned thereto which is not provided in human-readable form in the imprint; and at least one item presentation station to which items are presented in authenticating the same, wherein the at least one item presentation station is configured to transmit data relating to the indicium on an item presented thereto to the processing unit and receive an authentication message in dependence upon whether the indicium is determined to be valid or invalid, with the assigned security parameter having to be satisfied in authenticating the indicium.

In one embodiment the security parameter includes an assigned personal security code, whereby the indicium is authenticated only when presented with the assigned security code.

In one embodiment the security parameter includes a time frame code, whereby the indicium is authenticated only when presented within a predefined time period.

In one embodiment the security parameter includes an assigned location code, whereby the indicium is authenticated only when presented at one or more predefined item presentation stations.

In one embodiment the security parameter includes an assigned merchant code, whereby the indicium is authenticated only when presented at one or more predefined merchants.

In a yet further aspect the present invention provides a method of authenticating items, the method, for each item, comprising the steps of: generating a transaction data stream at a remote center for an indicium to be applied to an item as an imprint, the indicium including a cryptographically-encoded component and having at least one security parameter assigned thereto which is not provided in human-readable form in the imprint; printing the imprint on an item; presenting the item including the indicium at an item presentation station; providing data relating to the indicium on the presented item to the remote center; authenticating the indicium, with the assigned security parameter having to be satisfied in authenticating the indicium; and providing an authentication message to the item presentation station in dependence upon whether the indicium is determined to be valid or invalid.

In one embodiment the security parameter includes an assigned personal security code, whereby the indicium is authenticated only when presented with the assigned security code.

In one embodiment the security parameter includes a time frame code, whereby the indicium is authenticated only when presented within a predefined time period.

In one embodiment the security parameter includes an assigned location code, whereby the indicium is authenticated only when presented at one or more predefined item presentation stations.

In one embodiment the security parameter includes an assigned merchant code, whereby the indicium is authenticated only when presented at one or more predefined merchants.

BRIEF DESCRIPTION OF THE DRAWINGS

Preferred embodiments of the present invention are described below by way of example only with reference to the accompanying drawings, in which.

DETAILED DESCRIPTION OF A PREFERRED EMBODIMENT

Figure 1:
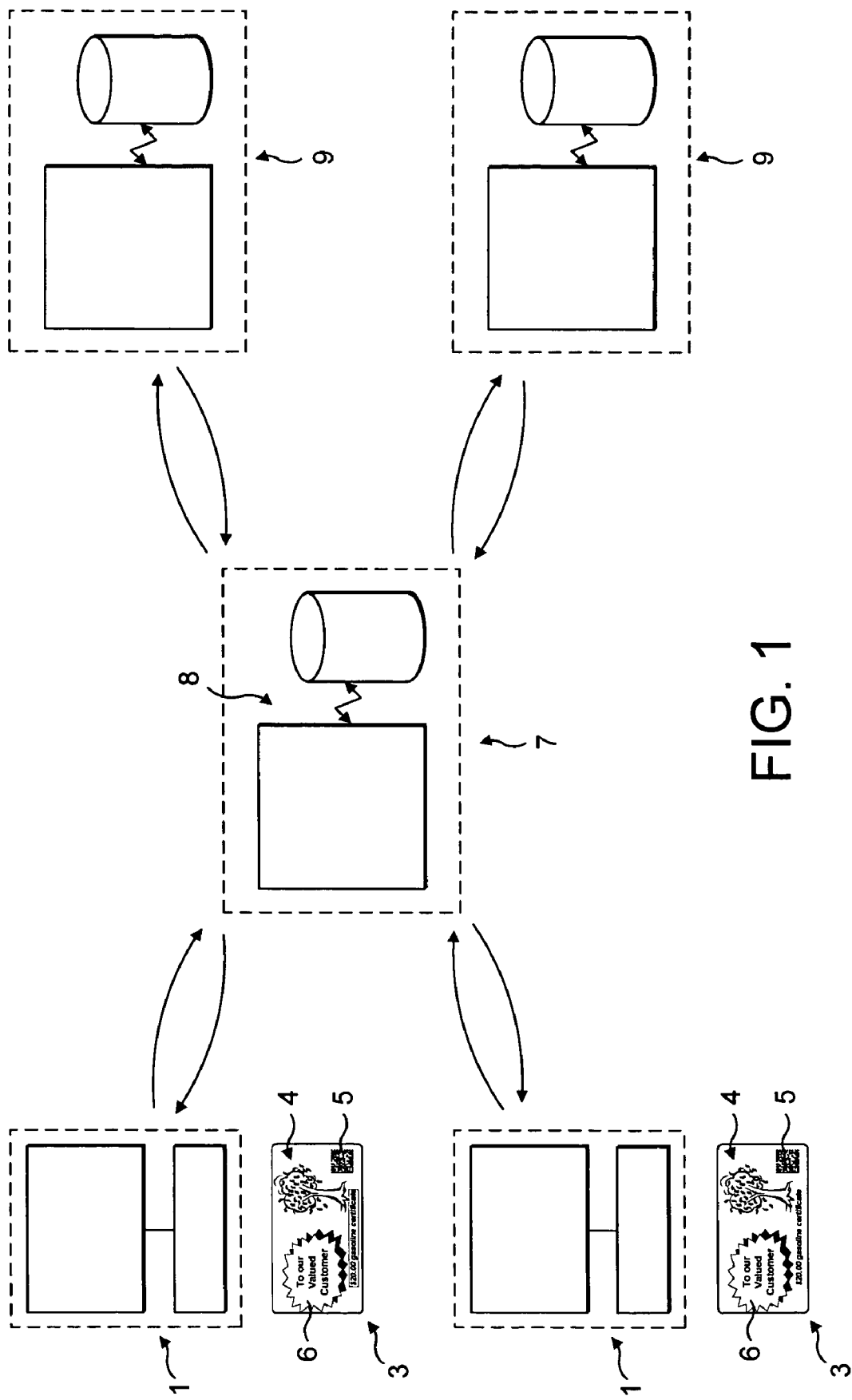
FIG. 1 illustrates an authentication system in accordance with a preferred embodiment of the present invention.
Figure 2:
FIG. 2 illustrates an exemplary imprint as printed by an item printing station of the authentication system of FIG. 1.

The authentication system comprises at least one, in this embodiment a plurality of item printing stations 1 for printing items 3 with an imprint 4, which includes a cryptographically-encoded indicium 5 and, in this embodiment, a graphic 6, typically an advertisement, at the request of respective users. FIG. 2 illustrates an exemplary imprint 4, here in the form of a coupon.

In this embodiment the item printing stations 1 can comprise private units, such as home-based units, for example, PC workstations, or office-based units, and public units, for example, kiosks. In one embodiment the item printing stations 1 can comprise postage metering units which are configured to provide the additional functionality required by the authentication system.

In one embodiment the item printing stations 1 can be operated by users to obtain a required imprint 4 on request.

In another embodiment the item printing stations 1, typically where being home-based units, can receive imprints 4, for example, by e-mail, as requested by third parties. One example includes third-party promotions, where the items 3 comprise coupons for redemption. Another example includes third-party loyalty awards, where the items 3 can comprise loyalty vouchers, such as money-off coupons.

In one embodiment, as in this embodiment, the items 3 embody monetary value. In one example the items 3 comprise tokens which have an assigned monetary value and are redeemable against any good or service as though a cash transaction. The monetary value can be in any currency, for example, the local currency or a foreign currency, akin to travelers' checks. In another example the items 3 comprise coupons which have an assigned monetary value and are redeemable against one or more designated goods or services as though a cash transaction. In a further example, the items 3 comprise coupons which have no assigned monetary value, but are redeemable against a designated good or service.

In another embodiment the items 3 comprise evidentiary documents. In one example, the items 3 comprise a permit, such as a drivers' license. In another example the items 3 establish title, such as property deeds. In a further example, the items 3 comprise tickets, such as lottery tickets, travel tickets or facility passes, typically passes to an event.

The authentication system further comprises a server unit 7 which is operably in communication with the item printing stations 1 and configured to generate imprints 4 for transmission to respective ones of item printing stations 1, transmit the imprints 4 to the respective item printing stations 1 to provide for printing of items 3 bearing the imprints 4, and subsequently authenticate the validity of imprints 4 as presented to a third party.

In this embodiment the server unit 7 comprises a remotely-located server 8. In other embodiments the server unit 7 can comprise a plurality of remotely-located servers 8.

In this embodiment the identification of a user where communicating with the server unit 7 from an item printing station 1 is by digital signature, where a communication signed by the private key of the user, here retrieved using a private password in compliance with public key infrastructure standards, is transmitted to the server unit 7 integrally together with the associated certificate, and the server unit 7 authenticates the user as the source of the signed communication through authentication of the signature and the content of the communication using the public key of the user as identified by the transmitted certificate.

In this embodiment a new key pair and certificate are generated by the item printing station 1 following each transaction with the server unit 7, with the certificate and the public key being transmitted to the server unit 7 for use with the next transaction.

In this embodiment the identification of the server unit 7 where communicating with an item printing station 1 is by digital signature, where a communication signed by the private key of the server unit 7 is transmitted to the item printing station 1 integrally together with the associated certificate, and the item printing station 1 authenticates the server unit 7 as the source of the signed communication through authentication of the signature and the content of the communication using the public key of the server unit 7 as identified by the transmitted certificate.

In this embodiment a new key pair and certificate are generated by the server unit 7 following each transaction with an item printing station 1, with the certificate and the public key being transmitted to the item printing station 1 for use with the next transaction.

In this embodiment subsequent communication between the user from the item printing station 1 and the server unit 7 is encrypted, here by asymmetric encryption using private/public key pairs. In an alternative embodiment the encryption can be by symmetric encryption using a secret key exchange.

In this embodiment the indicia 5 comprise barcodes. In one embodiment, as in this embodiment, the indicia 5 comprise two-dimensional barcodes. In an alternative embodiment the indicia 5 could comprise one-dimensional barcodes. In an alternative embodiment the indicia 5 could comprise alpha-numeric strings.

In this embodiment the indicia 5 each include a cryptographically-encoded component, here encoded by digital signature, which is utilized to authenticate the respective indicium 5, and a machine-readable component which includes an indicium identifier which provides for identification of the respective indicium 5. In one alternative embodiment the cryptographically-encoded component could be encoded by encryption, either asymmetric or symmetric encryption. In another alternative embodiment the cryptographically-encoded component could be encoded both by encryption, either asymmetric or symmetric encryption, and digital signature.

In this embodiment a new key pair is generated for encoding the cryptographically-encoded component of each indicium 5. In an alternative embodiment re-keying of the key pair for encoding the cryptographically-encoded component of the indicia 5 can be at predetermined intervals, typically following generation of a predetermined number of indicia 5.

In this embodiment the indicia 5 each have at least one additional, assigned security parameter which has to be satisfied in authenticating the respective items 3.

In one embodiment the indicia 5 each have an assigned security code, such as a personal identification number (PIN), which provides that the respective indicia 5 are authenticated only when presented with the assigned security code. In one embodiment the assigned security codes are specified by the respective users in generating the respective indicia 5. In another embodiment the assigned security codes are determined by the server unit 7 in generating the respective indicia 5. Where the assigned security codes are determined by the server unit 7, the security codes can be communicated by means which are separate from the imprints 4, for example, as a printable code.

In one embodiment the indicia 5 each have an assigned time frame code which provides that the respective indicia 5 are authenticated only when presented within a limited period, typically in hours, days or weeks, from the time of generation. In one example, in relation to an item 3 embodying a monetary value, in particular a high monetary value, which is generated by the user, the indicium 5 can provide that the item 3 could have a period of validity in terms of hours, which represents the time period available to the user to present the item 3. In another example, in relation to an item 3 generated by a third party, such as a coupon in respect of goods or services, the indicium 5 can provide that the item 3 could have a period of validity in terms of days or weeks, which represents the time period available to the user to present the item 3.

In one embodiment the indicia 5 each have an assigned location code which provides that the respective indicia 5 are authenticated only when presented at one or more geographic locations. In one example, where the item 3 is a money transfer document, akin to a check, the indicium 5 could provide that the item 3 is only valid where presented at a banking facility at one or more geographic locations. In another example, where the item 3 is a coupon, the indicium 5 could provide that the item 3 is only valid where presented to a merchant at one or more geographic locations.

In one embodiment the indicia 5 each have an assigned merchant code which provides that the respective indicia 5 are authenticated only when presented to one or more designated merchants. In one example, where the item 3 is a money order, akin to a check, the indicium 5 could provide that the item 3 is only valid where presented at one or more designated banking groups. In another example, where the item 3 is a coupon, the indicium 5 could provide that the item 3 is valid only where presented at one or more outlets.

The authentication system further comprises at least one, in this embodiment a plurality of item presentation stations 9 which are operably in communication with the server unit 7 and configured to read the indicia 5 on items 3 as presented by users, transmit data from the indicia 5 to the server unit 7 to provide for authentication, and subsequently receive notification from the server unit 7 as to the authenticity of the indicia 5.

In this embodiment the identification of an item presentation station 9 to the server unit 7 is by digital signature, where a communication signed by the private key of the item presentation station 9 is transmitted to the server unit 7 integrally together with the associated certificate, and the server unit 7 authenticates the item presentation station 9 as the source of the signed communication through authentication of the signature and the content of the communication using the public key of the item presentation station 9 as identified by the transmitted certificate.

In this embodiment a new key pair and certificate are generated by the item presentation station 9 following each transaction with the server unit 7, with the certificate and the public key being transmitted to the server unit 7 for use with the next transaction.

In this embodiment the identification of the server unit 7 to an item presentation station 9 is by digital signature, where a communication signed by the private key of the server unit 7 is transmitted to the item presentation station 9 integrally together with the associated certificate, and the item presentation station 9 authenticates the server unit 7 as the source of the signed communication through authentication of the signature and the content of the communication using the public key of the server unit 7 as identified by the transmitted certificate.

In this embodiment a new key pair and certificate are generated by the server unit 7 following each transaction with an item presentation station 9, with the certificate and the public key being transmitted to the item presentation station 9 for use with the next transaction.

In this embodiment subsequent communication between the item presentation station 9 and the server unit 7 is encrypted, here by asymmetric encryption using private/public key pairs. In an alternative embodiment the encryption can be by symmetric encryption using secret key exchange.

Figure 3:
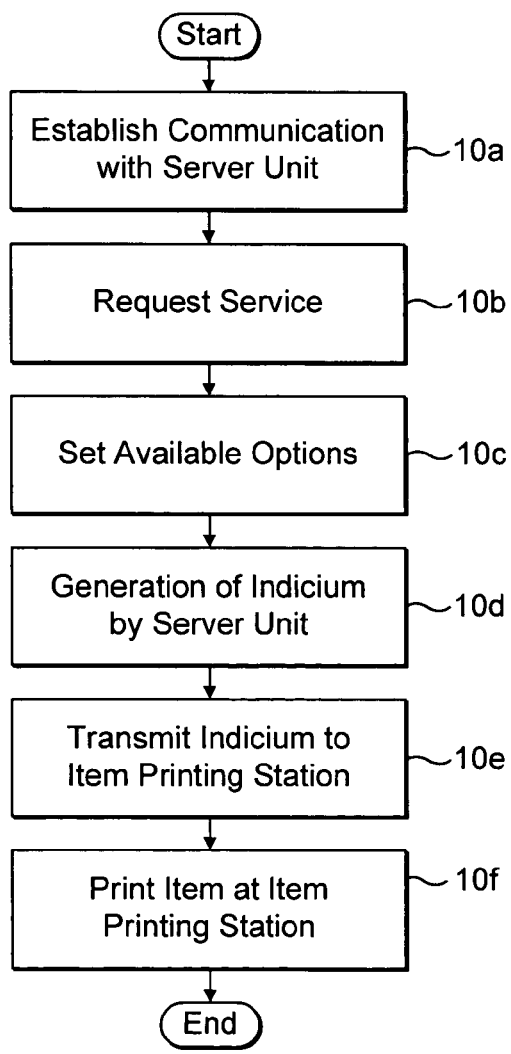
FIG. 3 illustrates a flow diagram for the printing of imprints on items in one mode of operation of the authentication system of FIG. 1.
Figure 4:
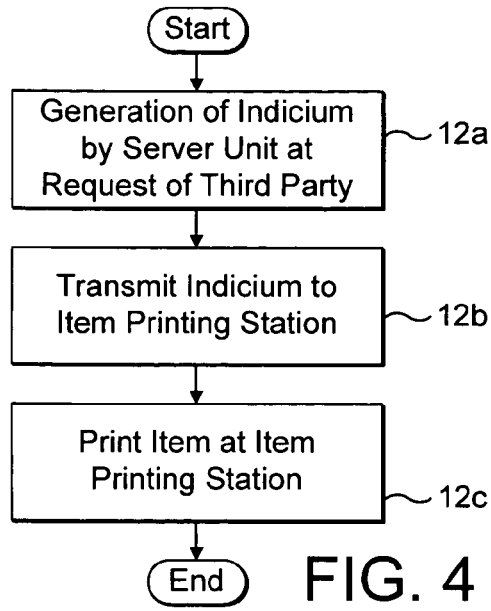
FIG. 4 illustrates a flow diagram for the printing of imprints on items in another mode of operation of the authentication system of FIG. 1.
Figure 5:
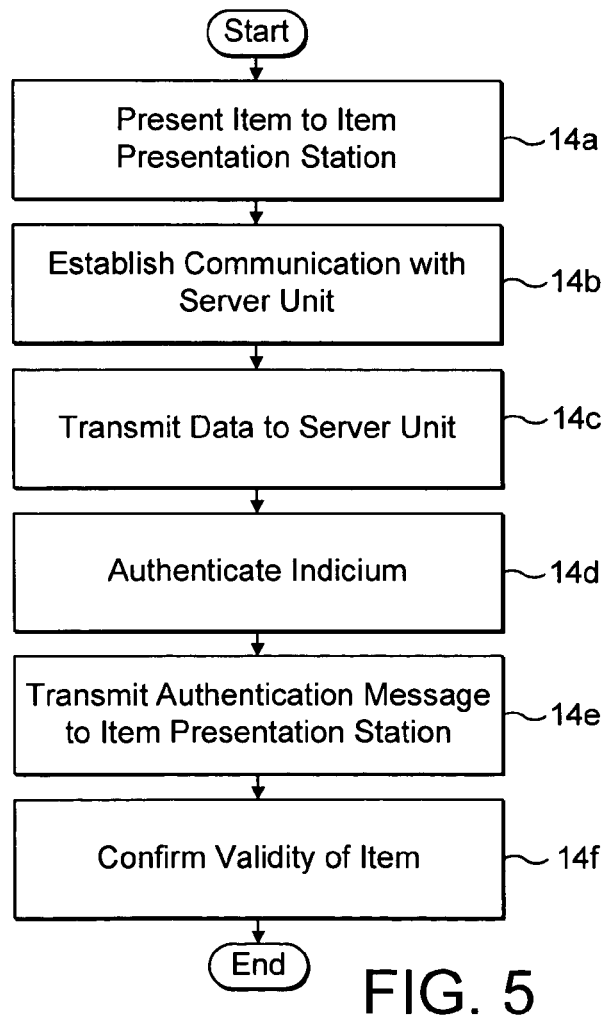
FIG. 5 illustrates a flow diagram for the authentication of imprints on items in operation of the authentication system of FIG. 1.

Operation of the authentication system is described below with particular reference to FIGS. 3 to 5 of the accompanying drawings.

One mode of printing items 3 is described below with reference to FIG. 3.

A user first enters a private password at an item printing station 1, and by means of signed communications establishes an authenticated communication with the server unit 7 (step 10*a*).

The user then requests a required service (step 10*b*), for example, a money order service, a coupon service or a ticket service.

Having requested a required service, the user then sets any available options (step 10*c*), for example, as to monetary value, currency and assigned security parameters, such as to use of a security code, time encoding, location encoding or merchant encoding. For any given service, ones or all of such options may not be available, in being predefined by the required service. In one example, for a money order service, the banking group from which the funds are debited could require that the item 3, as a money order, be presented within a predetermined time period. In another example, for a coupon service, the coupon provider from which the coupon is provided could require that the item 3, as a coupon, be presented either to a designated group of outlets or to an outlet at a specific geographic location.

On confirming the required service, the server unit 7 generates the indicium 5 for the imprint 4 for the requested service (step 10d), with the indicium 5 including a crypto graphically-encoded component.

The server unit 7 then transmits the generated indicium 5, in this embodiment in an encrypted communication, to the item printing station 1 (step 10e). In this embodiment the indicia 5 are transmitted on-line. In an alternative embodiment the indicia 5 could be transmitted separately, for example, by e-mail.

The item printing station 1 decrypts the received indicium 5 and prints the indicium 5, which includes the crypto graphically-encoded component, as an imprint 4 to provide an item 3 which the user can present at an item presentation station 9 (step 10f).

Another mode of printing items 3 is described below with reference to FIG. 4.

At the request of a third-party, the server unit 7 generates an indicium 5 for a specified service to be transmitted to a specified user (step 10a).

The server unit 7 then transmits the generated indicium 5 to the item printing station 1 of the specified user (step 12b). In this embodiment the imprint 4 is transmitted by e-mail.

The received indicium 5 is then printed at the item printing station 1 as an imprint 4 to provide an item 3 which the user can present at an item presentation station 9.

The procedure in presenting items 3 is described below with reference to FIG. 5.

On presenting the item 3 to an operator at an item presentation station 9, the indicium 5 on the item 3 is read by the item presentation station 9 (step 14a).

By means of signed communications, an authenticated communication is established between the item presentation station 9 and the server unit 7 (step 14b).

Following authentication to the server unit 7, the item presentation station 9 then transmits the data of the indicium 5 to the server unit 7 for authentication (step 14c).

The server unit 7 identifies the indicium 5 from the indicium identifier contained in the indicium 5, authenticates the indicium 5 (step 14d), and transmits an authentication message to the item presentation station 9 (step 14e).

In authenticating the indicium 5, the server unit 7 first performs a check to determine whether the indicium 5 has been previously presented. In one embodiment, where the indicium 5 has been previously presented, the server unit 7 transmits an indicium invalid message to the item presentation station 9.

In this embodiment, where the cryptographically-encoded component of the indicium 5 is digitally signed, the paired key for the indicium 5 is retrieved to authenticate the cryptographically-encoded component. Where the cryptographically-encoded component is not authenticated, the server unit 7 transmits an indicium invalid message to the item presentation station 9.

On authenticating the cryptographically-encoded component, any security parameters associated with the indicium 5 are subsequently authenticated. Where additionally assigned a security code, the security code input by the user at the item presentation station 9 is authenticated to check that the input security code matches the retrieved security code. Where additionally assigned a time code, the retrieved time parameter is authenticated to check that the item 3 is presented within the required time frame. Where additionally assigned a location code, the retrieved location parameter is authenticated to check that the item 3 is presented at a predefined item presentation station 9. Where additionally assigned a merchant code, the merchant parameter is authenticated to check that the item 3 is presented at an item presentation station 9 of a predefined merchant.

Where any security parameters associated with the indicium 5 are not authenticated, the server unit 7 transmits an indicium invalid message to the item presentation station 9.

Where the indicium 5 is authenticated, the server unit 7 transmits an indicium valid message, which confirms the service associated with the item 3. In one example, where the item 3 is a money order, the indicium valid message confirms the monetary value. In another example, where the item 3 is a coupon, the indicium valid message confirms the monetary value. In a further example, where the item 3 is a lottery ticket, the indicium valid message confirms the lottery numbers. In a yet further example, where the item 3 is a pass, the indicium valid message confirms the scope of the pass, such as to the facility and the date.

On receipt of an authentication message from the server unit 7, the item presentation station 9 confirms the validity of the item 3, and, where valid, allows for the user to proceed with the transaction (step 14f). Where the item presentation station 9 is configured to inspect tickets for a particular event, for example, a specific show on a given date, the item presentation station 9 can utilize the authentication message to present one of a valid or invalid message.

Finally, it will be understood that the present invention has been described in its preferred embodiments and can be modified in many different ways without departing from the scope of the invention as defined by the appended claims.

I claim:

1. An authentication system for authenticating items, comprising:
    a processing unit for generating indicia for imprints to be applied to items and authenticating imprints applied to items, each indicium including a cryptographically-encoded component;
    at least one item printing station for printing imprints on items as generated by the processing unit; and
    at least one item presentation station to which items are presented in authenticating the same, wherein the at least one item presentation station is configured to transmit data relating to the indicium on an item presented thereto to the processing unit, and receive an authentication message in dependence upon whether the indicium is determined to be valid or invalid,
    wherein the indicium comprises at least one security parameter which is not provided in human-readable form in the imprint,
    wherein data relating to a previously-authenticated indicium is stored by the processing unit and, if the transmitted data indicates the indicium is a duplicate of the previously authenticated indicium, the indicium is determined to be invalid.

2. The system of claim 1, wherein the indicium comprises a barcode.

3. The system of claim 2, wherein the indicium comprises a two-dimensional barcode.

4. The system of claim 1, wherein the cryptographically-encoded component is encoded by digital signature.

5. The system of claim 1, wherein the cryptographically-encoded component is encoded by encryption.

6. The system of claim 1, wherein the cryptographically-encoded component is encoded by encryption and digital signature.

7. The system of claim 6, wherein the at least one item printing station is configured to receive an indicium for an imprint from the processing unit as requested by a third party on behalf of a user, with the processing unit being configured to transmit the indicium for the imprint to the at least one item printing station.

8. The system of claim 1, wherein the at least one item printing station is operable by a user to print an imprint on an item.

9. The system of claim 8, wherein the at least one item printing station is configured to provide for a user to request an indicium for an imprint from the processing unit, with the processing unit being configured to transmit the indicium for the imprint to the at least one item printing station.

10. The system of claim 1, wherein the at least one item printing station is operable by a third party to print an imprint on an item for use by a user.

11. The system of claim 1, wherein the security parameter includes a time frame code, whereby the indicium is authenticated only when presented within a predefined time period.

12. The system of claim 1, wherein the security parameter includes an assigned location code, whereby the indicium is authenticated only when presented at one or more predefined item presentation stations.

13. The system of claim 1, wherein the items comprise documents.

14. The system of claim 13, wherein the documents embody monetary value.

15. The system of claim 13, wherein the documents comprise evidentiary documents.

16. A method of authenticating items, the method, for each item, comprising the steps of:
generating a transaction data stream for an indicium to be applied to an item as an imprint, the indicium including a cryptographically-encoded component;
printing the imprint on an item;
receiving data relating to the indicium;
authenticating the indicium;
comparing the data related to the indicium to stored data related to a previously authenticated indicium and, if the comparison indicates a duplicate, determining the indicium to be invalid; and
providing an authentication message to the item presentation station in dependence upon whether the indicium is determined to be valid or invalid,
wherein the indicium comprises at least one security parameter which is not provided in human-readable form in the imprint.

17. The method of claim 16, wherein the indicium comprises a barcode.

18. The method of claim 17, wherein the indicium comprises a two-dimensional barcode.

19. The method of claim 16, wherein the cryptographically-encoded component is encoded by digital signature.

20. The method of claim 16, wherein the cryptographically-encoded component is encoded by encryption.

21. The method of claim 16, wherein the cryptographically-encoded component is encoded by encryption and digital signature.

22. The method of claim 16, wherein the printing step is performed at the request of a user.

23. The method of claim 22, wherein the transaction data generating step is performed at the request of the user.

24. The method of claim 22, wherein the transaction data generating step is performed at the request of a third party on behalf of the user.

25. The method of claim 16, wherein the printing step is performed at the request of a third party to print the imprint on an item for use by a user.

26. The method of claim 16, wherein the security parameter includes a time frame code, whereby the indicium is authenticated only when presented within a predefined time period.

27. The method of claim 16, wherein the security parameter includes an assigned location code, whereby the indicium is authenticated only when presented at one or more predefined item presentation stations.

28. The method of claim 16, wherein the items comprise documents.

29. The method of claim 28, wherein the documents embody monetary value.

30. The method of claim 28, wherein the documents comprise evidentiary documents.

31. The method of claim 16, further comprising decrypting the data relating to the indicium using a public key of the presentation station, wherein the data relating to the indicium is encrypted with a private key of the presentation station.

32. The method of claim 31, further comprising receiving a new public key from the processing unit, wherein a new public-private key pair is generated by the presentation station following each authentication transaction.

33. The method of claim 16, wherein the security parameter includes a Personal Identification Number (PIN) and an assigned merchant code, whereby the indicium is authenticated only when presented at one or more predefined merchants.

34. The method of claim 16, wherein a user separately provides the PIN at the item presentation station and the indicium is determined to be valid only if the separately provided PIN matches the PIN included in the indicium.

35. An authentication system for authenticating items, comprising:
a processing unit for authenticating imprints applied to items, each imprint comprising an indicium including a cryptographically-encoded component and having at least one security parameter assigned thereto which is not provided in human-readable form in the imprint; and
at least one item presentation station to which items are presented in authenticating the same,
wherein the at least one item presentation station is configured to transmit data relating to the indicium on an item presented thereto to the processing unit and receive an authentication message in dependence upon whether the indicium is determined to be valid or invalid, with the assigned security parameter having to be satisfied in authenticating the indicium,
wherein data relating to a previously-authenticated indicium is stored by the processing unit and, if the transmitted data indicates the indicium is a duplicate of the previously authenticated indicium, the indicium is determined to be invalid.

36. The system of claim 35, wherein the security parameter includes a time frame code, whereby the indicium is authenticated only when presented within a predefined time period.

37. The system of claim 35, wherein the security parameter includes an assigned location code, whereby the indicium is authenticated only when presented at one or more predefined item presentation stations.

38. The system of claim 35, wherein the data relating to the indicium is encrypted with a private key of the presentation station and decrypted by the processing unit using a public key of the presentation station.

39. The system of claim 38, wherein a new public-private key pair is generated by the presentation station following each authentication transaction with the processing unit, and the new public key is sent to the processing unit for use in the following transaction.

40. The system of claim 35, wherein the security parameter includes a Personal Identification Number (PIN) and an assigned merchant code, whereby the indicium is authenticated only when presented at one or more predefined merchants.

41. The system of claim 35, wherein a user separately provides the PIN at the at least one item presentation station and the indicium is determined to be valid only if the separately provided PIN matches the PIN included in the indicium.

42. A method of authenticating items, the method, for each item, comprising the steps of:
   generating a transaction data stream for an indicium to be applied to an item as an imprint, the indicium including a cryptographically-encoded component and having at least one security parameter assigned thereto which is not provided in human-readable form in the imprint;
   printing the imprint on an item;
   receiving the item including the indicium at an item presentation station;
   providing data relating to the indicium on the presented item to the remote center;
   authenticating the indicium, with the assigned security parameter having to be satisfied in authenticating the indicium;
   comparing the data related to the indicium to stored data related to a previously authenticated indicium and, if the comparison indicates a duplicate, determining the indicium to be invalid; and
   providing an authentication message to the item presentation station in dependence upon whether the indicium is determined to be valid or invalid.

43. The method of claim 42, wherein the security parameter includes a time frame code, whereby the indicium is authenticated only when presented within a predefined time period.

44. The method of claim 42, wherein the security parameter includes an assigned location code, whereby the indicium is authenticated only when presented at one or more predefined item presentation stations.

* * * * *